E. KEMPSHALL.
TIRE FOR VEHICLE WHEELS.
APPLICATION FILED APR. 3, 1907.
901,244.
Patented Oct. 13, 1908.
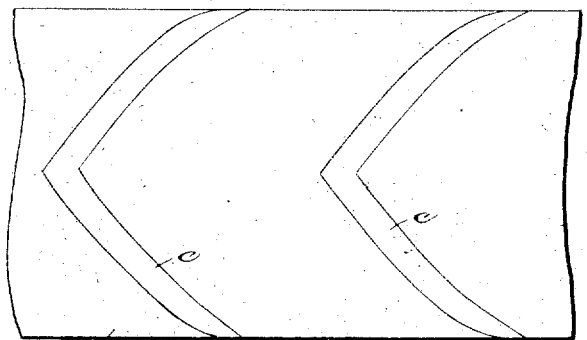
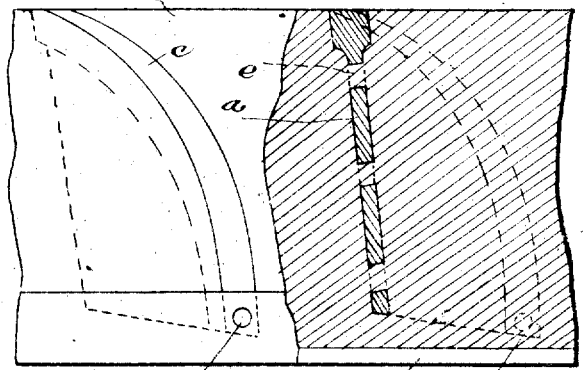
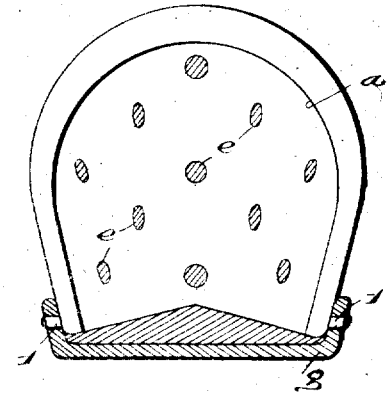
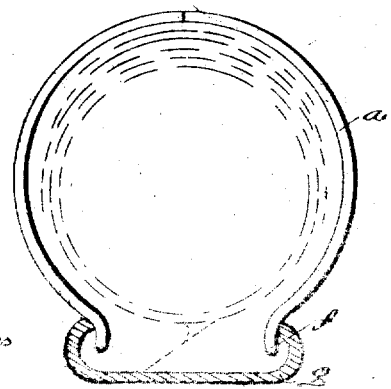
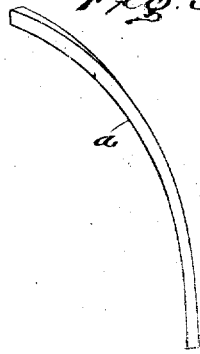
Inventor
E. Kempshall

UNITED STATES PATENT OFFICE.

ELEAZER KEMPSHALL, OF LONDON, ENGLAND, ASSIGNOR TO KEMPSHALL TYRE COMPANY, OF EUROPE, LIMITED, OF LONDON, ENGLAND.

TIRE FOR VEHICLE-WHEELS.

No. 901,244.     Specification of Letters Patent.     Patented Oct. 13, 1908.

Application filed April 3, 1907. Serial No. 366,089.

*To all whom it may concern:*

Be it known that I, ELEAZER KEMPSHALL, a citizen of the United States of America, and residing at the Hotel Russell, London, W. C., England, have invented certain new and useful Improvements Relating to Tires for Vehicle-Wheels, of which the following is a specification.

This invention relates to tires for the wheels of vehicles, and particularly to tires for the wheels of motor-propelled vehicles, the object being to provide means which will prevent side-slip or skidding.

The invention may be applied to solid tires, elastic tires comprising alternate sections of elastic and non-elastic material, or to penumatic tires.

The invention consists in providing at intervals in the tire, or in the thick outer cover of the tire, a number of metallic sections which will present anti-skidding edges at the tread surface.

The invention also consists in arranging these metallic sections in a non-radial manner, so that they present a surface which—when the wheel is under load—is flush with the elastic material of the tire, or tread surface thereof, so as to insure an efficient grip; but being non-radial to the wheel, they are permitted to give way slightly under the load, so as not to interfere with the elasticity of the tire.

The accompanying drawings illustrate several forms of carrying out the invention.

Figure 1 is a plan view of a portion of a tire showing the application of my invention. Fig. 2 is a side elevation of the same partially in section. Fig. 3 is a transverse sectional view taken in front of one of the metallic sections. Fig. 4 is a view of a slightly different form of my invention. Fig. 5 is a detail view of one of the metallic sections, shown in Fig. 4.

In carrying out the invention, a number of metallic sections *a* are embedded at intervals in a solid tire *b*. The sections *a* are provided with openings *e* through which the material of the tire passes to form a connection between the parts. The metallic sections are formed with ears *c*, which project to the tread surface, so that their edges are flush therewith; so that—when the load comes on the tire—the rubber or other elastic material between the ears is compressed, and leaves the steel projecting ears free to grip the road surface. The ears are inclined with relation to the tire tread to present an increased area in order to increase the resistance to side-slip or skidding. That is to say, the edge of the section, when viewed in plan (Fig. 1), appears like a V. The plates *a* are pivoted at *l* to the rim *g*, although in some cases these pivots *l* may be dispensed with.

When applying the invention to the covers of pneumatic tires, the metallic sections *a* are formed as frames—for instance, as illustrated in Figs. 4 and 5—these frames being let into suitable recesses in the outer cover, or molded in the outer cover, for instance, as indicated in Fig. 4, where the outer cover is denoted by dotted lines. These frames may simply have heels *f*, to engage beneath the in-turned sides of the rim, or they may be pivoted to the rim.

It is preferred to make the metallic sections of steel, but any other sufficiently hard material may be employed.

Having now described my invention, what I claim as new and desire to secure by Letters Patent is:

1. In an elastic tire, a number of metallic sections embedded in the tire, and presenting anti-skidding edges at the tread surface thereof, said metallic sections being pivoted to the rim, substantially as, and for the purposes, hereinbefore set forth.

2. In an elastic tire, a number of metal sections having angularly disposed wings embedded in the tire, the edge of each of the wings being of the same shape as the outer opposite longitudinal surfaces of the tire to form anti-skidding surfaces.

3. In an elastic tire for vehicle wheels, a number of non-radial metallic sections embedded in the tire and presenting V-shaped anti-skidding edges at the tread surface.

4. In an elastic tire for vehicle wheels, a number of non-radial metallic sections, embedded in the tire and presenting V-shaped anti-skidding edges at the tread surface, said sections being pivoted to the rim.

5. An elastic tire for vehicle wheels, comprising alternate elastic and non-elastic sections, and a number of pivotally mounted metallic sections presenting angular edges at the tread surface.

6. In combination, a rim, an elastic tire, a number of metallic anti-skidding sections in the elastic tire and pivoted to the rim, said metallic sections having overhanging portions embedded in the tread to cause the sections to rock on their pivots when a load is applied to the tire.

7. In an elastic tire, a number of substantially V-shaped metal sections embedded in the tire, the edges of the V-shaped sections being flush with the tire tread and positioned circumferentially therewith to provide anti-skidding surfaces.

8. In an elastic tire, a number of pivotally mounted metallic sections embedded in the tire and presenting anti-skidding edges at the tread surface thereof.

9. An elastic tire comprising a number of metallic sections embedded in said tire and having winged portions which extend to the surface to provide a series of substantially V-shaped anti-skidding surfaces on the tire tread.

10. In an elastic tire, a number of metallic sections embedded therein having wings embodied in the tire, and means for pivotally mounting the sections in the tire at a point distant from the edge where the wings meet.

In testimony whereof I have signed my name to this specification in the presence of two subscribing witnesses.

Dated this 8th day of February, 1907.

ELEAZER KEMPSHALL.

Witnesses:
   BERTRAM H. MATTHEWS,
   WALTER J. SKERTEN.